3,035,987
METHOD OF INCREASING THE WATER VAPOR POROSITY OF FAT MATERIALS
Günther Weitzel, Giessen, Germany, assignor to Wickhen Products, Inc., Milwaukee, Wis., a corporation of Wisconsin
No Drawing. Filed July 24, 1957, Ser. No. 682,995
6 Claims. (Cl. 167—90)

This invention relates to a process for increasing the water vapor porosity of fat components in cosmetic or pharmaceutical products and to a composition to be added to the fat components to increase the water vapor porosity of the same.

In the physiological metabolism of the skin, the release of water vapors through the skin plays an important role, for an undisturbed release of water vapors from the skin is a vital question for a healthy skin. The normal skin releases about 0.3 gram of water per second per square centimeter and thus, the total skin area of a non-perspiring adult person releases about 450 milliliters of water vapor in 24 hours.

A cream or ointment film applied to the skin for cosmetic or pharmaceutical purposes has the main task of protecting the skin surface against harmful outside influences. While almost all fat bases used in ointments or creams have excellent covering properties they hinder the outward penetration of water vapors given up by the skin. For example, lanolin ointment bases, fatty alcohols, mineral oils, waxes, etc., provide an excellent covering for the skin but prevent the flow of water vapor outwardly through the covering.

The present invention is based upon the discovery that by adding small amounts of an alkyl branched long-chained aliphatic compound to the fat components in cosmetic or pharmaceutical creams, the water vapor porosity of the fat components is substantially increased. This increase in the water vapor penetration through the fat components is based on the loosening of the tightly packed fat film by the addition of the branched chain additives. These branch chain additives build areas of disturbance in the tightly associated normal fat chains which allows the passage of water vapors through the fat films by a type of chimney action. It has been found that relatively small amounts of the branch chain additives when added to the fat component are sufficient to counteract entirely the inhibition of the skin breathing by the fat materials.

The fat components to which the present invention is to be applied include the conventional fatty materials which are ordinarily used for cosmetic and pharmaceutical ointments, creams, lotions, salves and the like. The fat materials include substances such as lanolin, petrolatum, lard, mineral oils, vegetable oils such as peanut oil, mono and diglycerides such as cylcerine mono stearate and glycerine di ricinoleate, polyethylene oxides such as carbo waxes, waxes such as spermaceti and beeswax, fatty alcohols such as cetyl, myristyl and lauryl alcohol, fatty acids such as stearic and palmitic acid, and other materials. The above mentioned fat materials can be used alone or in combination to provide the fatty base for the cosmetic or pharmaceutical product.

The above mentioned straight chain fat materials when applied to the skin in thin layers, either by themselves or as mixtures, cause a substantial decrease in the water vapor output of the skin. This decrease in the water vapor output is reduced to a fraction of the normal value of that of the human skin which is not covered by the fatty materials.

According to the invention, the water vapor penetration of the fat component can be substantially increased and thereby approximate that of an uncovered human skin by the addition of 1 to 10% by weight of alkyl branched aliphatic compounds to the fat component. These compounds include alkyl branched alcohols and acids having from 5 to 20 carbon atoms in the open chain and esters thereof.

The acids which may be employed in the present composition may be branched chain derivatives of saturated or unsaturated acids, such as lauric, myristic, palmitic, stearic, oleic, linoleic, or the like. They also may be branched chain derivatives of hydroxy acids such as hydroxy-caprylic, hydroxylauric, hydroxystearic and ricinoleic acid.

The alcohols which may be employed in combination with the fat components include branched chain derivatives of saturated or unsaturated mono-hydroxy alcohols such as heptanol, decanol, lauryl alcohol, cetyl alcohol, stearyl alcohol, heptenol, decenol, oleyl alcohol and the like.

The alkyl branch which is attached to the alcohol or acid contains less than three carbon atoms in the radical and consists of a methyl or ethyl group. If only one alkyl branch is present in the compound, the alkyl group is spaced at least one carbon atom from the carbonyl group in the alcohol or acid and is also spaced at least one carbon atom from the opposite end carbon in the chain. For example, if the alkyl branch is added to palmitic acid, the alkyl radical should not be attached to No. 1, 2, 15 or 16 carbon atoms, for it has been found that effectiveness of the compound in increasing the water vapor penetration is proportional to the position of the alkyl branch toward the middle of the chain.

If more than one alkyl branch is present in the compound, at least one of the alkyl branches should be located on the middle carbons in the chain and spaced at least one carbon from the end carbons in the chain. In this case, the additional alkyl branches may be located on the end carbons or the second carbons from the end without adversely effecting the properties of the compound.

The following compounds are examples of alkyl branched acids or alcohols which can be employed as additives to fat components in cosmetic or pharmaceutical products to increase the water vapor porosity of the same: 5-methyl palmitic acid; 9-ethyl stearic acid; 7-methyl lauric acid; 3,7,11,15-tetramethyl palmitic acid; 4,6-diethyl lauric acid; 10-methyl oleic acid; 7-methyl ricinoleic acid; 3-methyl, 7-ethyl stearic acid; 3,7,10-methyl oleic acid; 7-ethyl hydroxy lauric acid; 10-methyl hydroxy stearic acid; 8-methyl cetyl alcohol; 12-ethyl stearyl alcohol; 5-methyl decanol; farnesol; phytol; citronellol; geraniol; 3,7,11,15-tetramethyl palmitol; 5-ethyl heptanol; 5-methyl decanol; 4-methyl, 6,8-ethyl lauryl alcohol; 9,11-methyl cetyl alcohol and the like.

In addition to the use of alkyl branched acids and alcohols, as described above, straight chain esters of the above alcohols and acids may also be employed to increase the water vapor porosity of the fat component. In this regard, the esterifying alcohol to be reacted with the alkyl branched acid should be a straight chain mono or poly hydroxy alcohol having up to 20 carbon atoms in the molecule. Similarly, the acid used to esterfy the alkyl branch alcohol should be a straight chain acid having up to 20 carbon atoms in the molecule. In regard to the ester, only one branch chain compound should be employed to make the ester and the other compound should be a straight chain without branches.

The following compounds are examples of esters that can be added to fat materials to increase the water vapor porosity thereof: 5-methyl palmitic acid cetyl ester; 4,6-diethyl palmitic acid ethyl ester; 7-methyl myristic acid triglyceride; 3,7,11-trimethyl oleic acid decanate; farnesol laurate; citronellol palmitate; methyl octadecanol caprylate; 3,7,11,15-tetramethyl octadecanol acetate; 4,6-diethyl dodecanol laurate; and the like.

An example of the effectiveness of the branch chain compounds in increasing the water vapor porosity of the fat component, a five percent addition of 9-methyl palmitic acid to normal palmitic acid is sufficient to entirely destroy the inhibition of the normal palmitic acid to water vapor porosity and the water vapor can move freely through the fat component without obstruction due to the small addition of the alkyl branch acid.

As another example, an eight percent addition of 10-methyl octadecanol to a normal octadecanol film completely destroys the resistance of the normal octadecanol to the penetration of water vapors.

Preparation of Mono Alkyl Branched Fatty Acids

To prepare 4-methyl myristic acid, 6-methyl palmitic acid, and 8-methyl stearic acid, 2-methyl dodecanol having a boiling point of a 130–140° C. at 8 mm. of mercury is converted into its bromide by treating it with 48% hydrobromic acid. The resulting bromide is then reacted with malonic acid ester. This reaction product is 2-methyl-dodecanol-1 malonic acid ester with a boiling point of 202–205° C. at 7 mm. This ester is then saponified with an alcoholic sodium hydroxide solution. By the saponification 2-methyl-dodecal-1-malonic acid results. The heating of this acid at 10 mm. pressure to 200° C. decarboxylates the same to 4-methyl-myristic acid. The boiling point of this acid is 198–202° C. at 50 mm. and the melting point is 25–26° C.

The 4-methyl myristic acid is converted to its ethyl ester by boiling it with an ethanol-toluene mixture in the presence of concentrated sulphuric acid. This ester is then reduced with lithium aluminum hydroxide to 4-methyl tetradecanol having a boiling point of 136–140° C. at 0.5 mm.

The 4-methyl tetradecanol is again converted to its bromide with hydrobromic acid. The reaction of the resulting bromide with sodium malonic ester gives 4-methyl tetradecanol-1 malonic ester with a boiling point of 179–184° C. at 0.5 mm. Saponification and decarboxylation of this ester gives 6-methyl palmitic acid having a boiling point of 173° at 2 mm. of mercury and a melting point of 30–31° C.

By the same synthesis, 6-methyl hexadecanol is produced from the 6-methyl palmitic acid ethyl ester. From this latter compound the bromide is again built and reacted with sodium malonic acid ester which gives 6-methyl hexadecanol-1 malonic ester with a boiling point of 188° C. at 0.3 mm. of pressure. By saponification and decarboxylation of this product, 8-methyl stearic acid is produced which has a boiling point of 184° C. at 0 mm. pressure and has a melting point of 33–34° C.

The mono alkyl branch higher fatty acids produced by the above synthesis can be employed alone or in mixtures as additions to the fat materials. A 5% by weight addition of the alkyl branched acid to the fat components will substantially increase the water vapor penetration of the fat component so that the water vapor released from the skin can pass freely through the fat film.

*The Preparation of Mono Alkyl Branched Fatty Alcohols*

The synthesis described in regard to the mono alkyl branched fatty acids also yields the higher mono alkyl branched fatty alcohols as for example, 6-methyl hexadecanol. If the end product of the above mentioned synthesis, 8-methyl stearic acid, is converted to its ethyl ester and the ester is then reduced with lithium aluminum hydroxide or metallic sodium, 8-methyl octadecadonal is produced which has a boiling point of 155° C. at 0.5 mm. of pressure.

The mono alkyl branched fatty alcohol can be added in the amount of 1 to 10% to the fat components and serves to loosen the fat film so that water vapor can penetrate freely through the film.

*Preparation of Esters*

To prepare the ester of an alkyl branched fatty alcohol, such as dihydro citronellol myristinate, myristic acid chloride is reacted with an equimolar amount of dihydro citronellol in pyridene. The yielded end product is dihydro citronellol myristinate having a boiling point of 226° to 228° C. at 0.5 mm. and has a saponification value of 152.2.

The above prepared ester is a soft paste at room temperature and can be employed in amounts of 1 to 10% by weight of the fat components. It has been found that adding from 3 to 5% by weight of the ester provides the fat component with a 100% water vapor porosity.

The present invention provides a method of substantially increasing the water vapor porosity of a fat material by the addition of a small amount of an alkyl branched, aliphatic acid, alcohol or ester. The addition of the branched chain compound to the fat material builds areas of disturbance in the tightly associated fat film and thereby increases the porosity of the fat film to water vapor.

Various modes of carrying out the invention are contemplated as being within the scope of the following claims particularly pointing out and distinctly claiming the subject matter which is regarded as the invention.

I claim:

1. A method of increasing the water vapor porosity of a fat component in a cosmetic product, comprising combining with the fat component from 1 to 10% by weight of a substance consisting essentially of an alkyl branched aliphatic compound, said branched chain aliphatic compound being selected from the group consisting of, (*a*) a mono-hydroxy alcohol having from 5 to 20 carbon atoms in the open chain and having at least one alkyl branch chain containing less than 3 carbon atoms with said branch chain spaced at least one carbon atom from the end carbon atoms in said open chain, (*b*) an acid having from 5 to 20 carbon atoms in the open chain and having at least one alkyl branch chain containing less than 3 carbon atoms with said branch chain spaced at least one carbon atom from the end carbon atoms in said open chain, and (*c*) straight chain esters of said alcohols and acids with said straight chain having up to 20 carbon atoms, said addition of the branched chain compound serving to substantially increase the porosity of the fat component to water vapor.

2. A method of increasing the water vapor porosity of a straight chain aliphatic fat component in a cosmetic or pharmaceutical product, comprising adding to the fat component from 1 to 10% by weight of a substance consisting essentially of an alkyl branched aliphatic compound, said branched chain aliphatic compound being selected from the group consisting of, (*a*) a mono-hydroxy alcohol having from 5 to 20 carbon atoms in the open chain and having a branch chain selected from the group consisting of ethyl and methyl spaced at least one carbon atom from the end carbon atoms in said open chain, (*b*) an acid having from 5 to 20 carbon atoms in the open chain and having a branch chain spaced at least one carbon atom from the end carbon atoms in said open chain, said branch chain being selected from the group consisting of methyl and ethyl, and (*c*) straight chain esters of said alcohols and acids with said straight chain having up to 20 carbon atoms, said addition of the branched chain compound serving to substantially increase the porosity of the fat component to water vapor.

3. A method of increasing the water vapor porosity of an aliphatic fat component in a cosmetic product, comprising adding to the fat component from 1 to 10% by weight of a compound consisting essentially of an alkyl branched aliphatic mono hydroxy alcohol having from 5 to 20 carbon atoms in the open chain and having an alkyl branch chain containing less than 3 carbon atoms with said branch chain spaced at least one carbon atom from the end carbon atoms in said open chain and said alcohol being free of other substituent groups, said addition of said alcohol serving to substantially increase the porosity of the fat component to water vapor.

4. A method of increasing the water vapor porosity of an aliphatic fat component in a cosmetic product, comprising adding to the fat component from 1 to 10% by weight of a compound consisting essentially of an alkyl branched aliphatic fatty acid having from 5 to 20 carbon atoms in the open chain and having an alkyl branch chain containing less than 3 carbon atoms with said branch chain spaced at least one carbon atom from the end carbon atoms in said open chain, said addition of said compound serving to substantially increase the porosity of the fat component to water vapor.

5. A method of increasing the water vapor porosity of an aliphatic fat component in a cosmetic product, comprising adding to the fat component from 1 to 10% by weight of a compound consisting essentially of an aliphatic straight chain ester of an alkyl branched chain aliphatic compound, said straight chain having up to 20 carbon atoms and said branched chain aliphatic compound being selected from the group consisting of; (a) a monohydroxy alcohol having from 5 to 20 carbon atoms in the open chain and having a branch chain containing less than 3 carbon atoms with said branch chain spaced at least one carbon atom from the end carbon atoms in said open chain, (b) an acid having from 5 to 20 carbon atoms in the open chain and having a branch chain containing less than 3 carbon atoms with said branch chain spaced at least one carbon atom from the end carbon atoms in said open chain, said addition of said compound serving to substantially increase the porosity of the fat component to water vapor.

6. A method of preparing a cosmetic or pharmaceutical product, comprising modifying a fat component by admixing therewith from 1 to 10% by weight of a substance consisting essentially of an alkyl branch aliphatic compound, said branched chain aliphatic compound being selected from the group consisting of, (a) a monohydroxy alcohol having from 5 to 20 carbon atoms in the open chain and having at least one alkyl branch chain containing less than 3 carbon atoms with said branch chain spaced at least one carbon atom from the end carbon atoms in said open chain, (b) an acid having from 5 to 20 carbon atoms in the open chain and having at least one alkyl branch chain containing less than 3 carbon atoms with said branch chain spaced at least one carbon atom from the end carbon atoms in said open chain, and (c) straight chain esters of said alcohols and acids with said straight chain having up to 20 carbon atoms, and incorporating said modified fat component into a cosmetic product with said substance serving to substantially increase the porosity of the fat component to water vapor.

References Cited in the file of this patent
UNITED STATES PATENTS
2,258,132 Carpenter _____ Oct. 7, 1941

OTHER REFERENCES
Chem. Abs. (ACS), vol. 47, 1953, page 334; vol. 48, 1954, page 4651.
Markley: Fatty Acids, Interscience, pub., N.Y., 1947, pages 39–40.
Poucher: Perf. Cos. & Soaps, D. Van Nostrand Co., N.Y., 5th ed., 1942, vol. I, pages 35, 121–3.
Goodman: Cosmetic Dermatology, McGraw-Hill, New York, 1st ed., 1936, p. 386.
Schimmel Briefs, Schimmel & Co., N.Y., No 165, Dec. 1948; No. 222, Sept. 1953; No. 226, January 1954 (1 p. each).